No. 663,285. Patented Dec. 4, 1900.
M. J. LOHRBACH.
DISK SHARPENER.
(Application filed July 6, 1900.)
(No Model.)
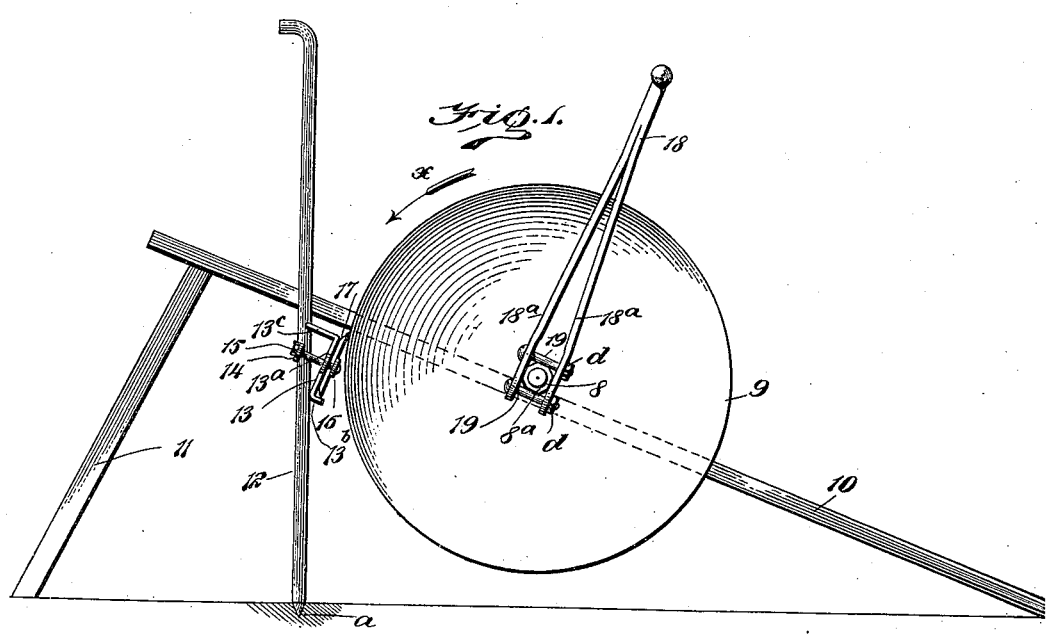
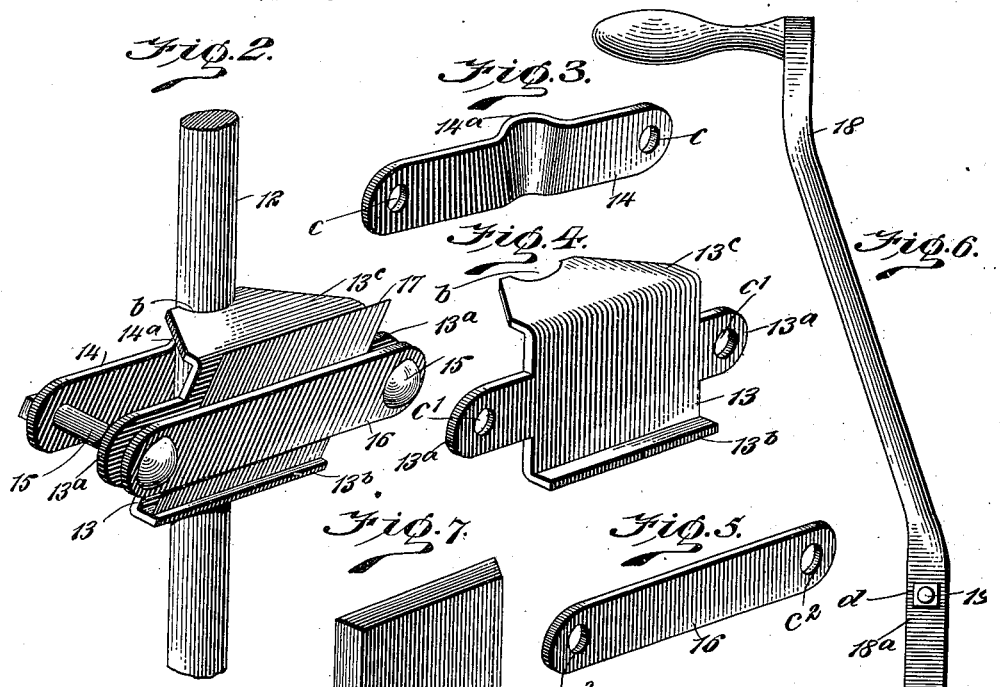
WITNESSES:
H. S. Dieterich
Wm. P. Patton
INVENTOR
Martin J. Lohrbach
BY Munn
ATTORNEYS
THE NORRIS PETERS CO., PHOTO-LITHO., WASHINGTON, D. C.

UNITED STATES PATENT OFFICE.

MARTIN J. LOHRBACH, OF PEOTONE, ILLINOIS.

DISK-SHARPENER.

SPECIFICATION forming part of Letters Patent No. 663,285, dated December 4, 1900.

Application filed July 6, 1900. Serial No. 22,684. (No model.)

*To all whom it may concern:*

Be it known that I, MARTIN J. LOHRBACH, a citizen of the United States, and a resident of Peotone, in the county of Will and State of Illinois, have invented a new and Improved Disk-Sharpener, of which the following is a full, clear, and exact description.

This invention relates to means for manually sharpening the cutting edges of harrow or plow disks, and has for its object to provide a novel, simple, and portable machine adapted for convenient support and application to harrow-disks or the like while in place on their supporting-shaft and sharpen the cutting edge of each disk when applied thereto and the disk-shaft is rotated.

The invention consists in the novel construction and combination of parts, as is hereinafter described, and indicated in the appended claims.

Reference is to be had to the accompanying drawings, forming a part of this specification, in which similar characters of reference indicate corresponding parts in all the figures.

Figure 1 is a side view of the improvement applied upon the shaft and disk of a harrow in position to sharpen the edge of the disk. Fig. 2 is an enlarged perspective view of a cutter-blade, a supporting-holder wherein the blade is held for service, and a post in part whereon the holder is adjustably secured. Figs. 3, 4, and 5 are perspective views of details of the blade-holder. Fig. 6 is a side view of a crank-handle having features of the invention, and Fig. 7 is a perspective view of a cutter-blade employed.

Disk harrows, the cutters whereof the improvements serve to sharpen, as ordinarily constructed each consist of a suitable frame (not shown) and a transversely-disposed axle or shaft held to rotate thereon, a proper number of similar disk cutter-blades being mounted and held spaced apart upon said shaft, so as to permit the edges of the disks to engage with the ground over which the harrow is drawn.

In Fig. 1, 8 represents one end of the transverse shaft of a disk harrow, said shaft for convenience in illustrating the application of the improvement being removed from the harrow-frame; but it is to be understood that in using the sharpening device hereinafter described the shaft 8 and the cutters thereon may remain in place on the harrow-frame.

One of the disk cutters constituting the ground-pulverizers of the harrow is indicated by the numeral 9 in Fig. 1, and a binding-nut $8^a$ is shown screwed on the end of the shaft 8. To facilitate the use of the improved disk-sharpening machine, it is essential that convenient means be provided for the elevation of the shaft 8 and the disks 9 thereon above the ground or a floor that normally supports the harrow by contact of the edges of the disks therewith, such elevation being necessary to permit the free rotation of the shaft and disks. To this end a jack-frame is preferably employed, consisting of a beam 10, having a leg 11 extended laterally therefrom near one of its ends. In service the beam 10 is introduced beneath the axle 8, which has been lifted a proper distance from the ground or floor, the shaft resting on the beam when one end of the latter engages the floor, and the opposite end is supported above the floor by the leg 11, as clearly shown in Fig. 1.

A post 12 is provided for the support of the sharpening device proper in position for service, and, as best shown in Fig. 1, said post is in the form of a cylindrical metal bar pointed at the lower end, as at $a$, for engagement with the ground or floor and having a suitable length, so that when in an upright position for service it will permit the user of the machine to readily grasp the upper portion of the post and manipulate the same, as is hereinafter explained.

The blade-holder is formed of three pieces. (Separately shown in Figs. 3, 4, and 5.) As represented in Figs. 1, 2, and 4, a main portion of the blade-holder consists of the bracket 13, bent from plate metal or cast into form, as may be preferred. The body portion of the bracket 13 is flat, and at opposite points on the side edges thereof two integral ears $13^a$ are outwardly extended in the same plane with the body portion. At the lower edge of the body portion a flange $13^b$ is projected outwardly therefrom, and above the ears $13^a$ said body portion is bent in a lateral direction opposite that of the flange $13^b$, as shown at $13^c$.

The upper bent portion or flange 13ᶜ is scalloped on the free end, as shown at *b* in Figs. 2 and 4, and the corners of this flange may be removed to reduce weight and give shapeliness to the bracket.

A clamping-plate 14 (shown in Fig. 3) is part of the holder device and is formed of plate metal having a length about equal to the distance between the ends of the ears 13ᵃ and of the same width, perforations *c*, formed in the end portions of the clamping-plate, being adapted to correspond with like perforations *c'* in the ears, so that headed clamping-bolts 15 may be freely introduced therethrough and be held in place by a nut screwed upon the end of each bolt, that is threaded as usual to receive the nut. At the center of length the clamping-plate 14 is curved outwardly, as shown in Fig. 3, this arched portion 14ᵃ of the clamping-plate having a conformation which adapts it to fit upon the body of the post 12. A flat clamping-plate 16 is provided to likewise receive the bolts 15 and has perforations $c^2$ therein near its ends, which will register with the perforations *c* and *c'* when the parts of the holder are assembled.

A preferably rectangular cutter-blade 17 is employed in connection with the holder device that has been described, and, as shown in Fig. 7, the cutter-blade is formed with parallel sides, and each of the four edges is beveled from the same side, thus producing four cutting edges that may be separately employed, as will presently be explained.

In mounting the blade-holder on the post 12 the bracket 13 is placed at a proper height against the side of the post, thereby contacting the lower transverse edge therewith and also the edge of the scallop *b* in the upper flange 13ᶜ. The cutter-blade 17 is now imposed upon the front face of the body of the bracket 13, with the face that is bounded by the four cutting edges outermost. The clamps 14 and 16 are respectively placed in contact with the post 12 and cutter-blade 17 and connected by the bolts 15, the nuts on which bolts, if properly adjusted, will bind the holder device and the cutter-blade thereon at a desired point on the post 12.

As shown in Figs. 1 and 2, the cutter-blade 17 when clamped upon the holder device has one cutting edge thereof seated upon the bottom flange 13ᵇ of the bracket 13, which will dispose an opposite parallel cutting edge of the blade above the flange 13ᶜ on the bracket 13. The projection of the flange 13ᶜ from the body of the bracket 13 is sufficient in degree to suitably incline the cutter-blade 17 forwardly, and thus adapt the top cutting edge of the same to have contact with the edge of the disk 9 on the shaft 8 when the complete machine is arranged for service, as represented in Fig. 1.

A crank-handle 18 is a feature of the invention, and, as shown in Figs. 1 and 6, consists of a metal bar having its body split from one end toward the other, thus providing two limbs 18ᵃ, which near their free ends are rendered parallel with each other. These parallel portions of the crank-handle 18 are perforated at two opposite points for the reception of two bolts 19, which are sufficiently spaced apart for the admission of the nut 8ᵃ between said bolts and the limbs of the crank-handle, as shown in Fig. 1, a screwed adjustment of nuts *d* on the ends of the bolts 19 serving to bind said limbs against the opposite sides of the nut 8ᵃ.

As before stated, the shaft 8 is furnished with the nut 8ᵃ to hold in place the cutter-disks 9, and when the nut is properly screwed upon the end of the shaft it will act as a driver when the crank-handle is rotated.

To operate the device, the user thereof takes position near the shaft 8 and grasps the upright post 12, while another man revolves the crank-handle 18 in the direction of the arrow *x* in Fig. 1. The cutter-blade 17 is pressed into contact with the edge of the disk 9 and removes a slight amount of metal therefrom, which will quickly sharpen the dull edge of the disk. By providing four cutting edges for the blade 17 these edges may be successively used, and said blade may be continued in service without resharpening until all the disks have been sharpened.

It is obvious that the post and cutting device held thereon may be successively positioned opposite each one of the disks 9 of the harrow, and the operation above described may be repeated for the renewal of the sharp edges on all the harrow-disks.

It will be seen that the improved disk-sharpening device is very simple, is inexpensive to manufacture, is readily placed in position for service, and affords efficient and convenient means for the proper sharpening of the disks.

Having thus fully described my invention, I claim as new and desire to secure by Letters Patent—

1. The combination with means for supporting a harrow-shaft and disks thereon free for rotation, of a crank-handle having a furcated body forming two limbs, and bolts adapted to clamp said limbs upon an end of the shaft.

2. The cutter-blade holder, comprising a bracket having a top flange bent laterally from its body, a lower flange bent oppositely from the top flange, two opposing clamping-plates, and clamping-bolts having nuts, said bolts engaging perforations near the ends of the clamping-plates.

3. The cutter-blade holder, comprising a plate-metal bracket having a top, laterally-bent flange thereon, a bottom flange oppositely extended from the bracket, the top flange having its outer end scalloped, ears projecting oppositely from the side edges of the bracket, clamping-plates oppositely perforated near their ends, said perforations registering with the perforations in the ears, and clamping-bolts having nuts on one end thereof, said bolts engaging the perforations in the ears and the oppositely-disposed clamping-plates.

4. In a device of the character described, the crank-handle for rotating a supported harrow-shaft and disks thereon, consisting of a bar split from one end toward the other end, providing two limbs which are parallel near the free ends thereof, said limbs each having two spaced perforations therein, said perforations receiving two spaced bolts provided with nuts adapted to clamp the limbs toward each other.

In testimony whereof I have signed my name to this specification in the presence of two subscribing witnesses.

MARTIN J. LOHRBACH.

Witnesses:
HENRY AHLBORN,
WILLIAM JURRES.